United States Patent
Norberg et al.

(10) Patent No.: US 10,508,754 B2
(45) Date of Patent: Dec. 17, 2019

(54) VALVE DEVICE FOR THROTTLING A PRESSURE MEDIUM FLOW, AND DAMPING DEVICE FOR DAMPING PRESSURE PULSATIONS

(71) Applicant: Robert Bosch GmbH, Stuttgart (DE)

(72) Inventors: Jens Norberg, Stuttgart (DE); Patrick Schellnegger, Ludwigsburg (DE); Andreas Lechler, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/745,188

(22) PCT Filed: Aug. 1, 2016

(86) PCT No.: PCT/EP2016/068311
§ 371 (c)(1),
(2) Date: Jan. 16, 2018

(87) PCT Pub. No.: WO2017/054961
PCT Pub. Date: Apr. 6, 2017

(65) Prior Publication Data
US 2019/0011060 A1    Jan. 10, 2019

(30) Foreign Application Priority Data

Sep. 28, 2015    (DE) .................. 10 2015 218 557

(51) Int. Cl.
*F16K 47/04* (2006.01)
*B60T 17/04* (2006.01)
(Continued)

(52) U.S. Cl.
CPC ............. *F16K 47/04* (2013.01); *B60T 15/00* (2013.01); *B60T 17/04* (2013.01); *F16K 1/14* (2013.01);
(Continued)

(58) Field of Classification Search
CPC ... F16K 25/02; F16K 1/14; F16K 1/38; F16K 47/04; B60T 17/04
(Continued)

(56) References Cited

U.S. PATENT DOCUMENTS

| 177,564 A | * | 5/1876 | Rudd | ................. | F16K 17/0433 |
| | | | | | 137/469 |
| 4,421,359 A | * | 12/1983 | Hayashi | ................ | B60T 8/4004 |
| | | | | | 188/344 |
| 5,199,769 A | * | 4/1993 | Beck | ...................... | B60T 8/341 |
| | | | | | 137/514 |

FOREIGN PATENT DOCUMENTS

DE    40 28 941 A1    9/1991
DE    10 2013 220 331 A1    4/2015
(Continued)

OTHER PUBLICATIONS

International Search Report corresponding to PCT Application No. PCT/EP2016/068311, dated Sep. 30, 2016 (German and English language document) (5 pages).

*Primary Examiner* — Umashankar Venkatesan
(74) *Attorney, Agent, or Firm* — Maginot, Moore & Beck LLP

(57) ABSTRACT

A valve device includes a valve body that forms a throttle cross section and a valve element that sets the throttle cross section depending on the pressure. To avoid pulsation-induced noises, the valve element is configured with a flow-deflecting member that causes action upon the valve element with a transverse force. The flow-deflecting member prevents noise-causing vibrations of the valve element and permits a lower throttling effect of the valve device, in particular when volumetric flows are increased. A damping device, in particular for damping pressure pulsations in a brake circuit of a slip-controllable vehicle brake system, includes the valve device.

10 Claims, 2 Drawing Sheets

(51) Int. Cl.
  *F16K 1/14*     (2006.01)
  *F16K 1/38*     (2006.01)
  *F16K 25/02*    (2006.01)
  *B60T 15/00*    (2006.01)
  *F16K 47/16*    (2006.01)

(52) U.S. Cl.
  CPC ............... *F16K 1/38* (2013.01); *F16K 25/02* (2013.01); *F16K 47/16* (2013.01); *B60T 2270/10* (2013.01); *Y10T 137/785* (2015.04)

(58) Field of Classification Search
  USPC ........................................................ 137/514
  See application file for complete search history.

(56) References Cited

FOREIGN PATENT DOCUMENTS

JP    4-501840 A    4/1992
WO    91/04181 A1   4/1991

\* cited by examiner

VALVE DEVICE FOR THROTTLING A PRESSURE MEDIUM FLOW, AND DAMPING DEVICE FOR DAMPING PRESSURE PULSATIONS

This application is a 35 U.S.C. § 371 National Stage Application of PCT/EP2016/068311, filed on Aug. 1, 2016, which claims the benefit of priority to Serial No. DE 10 2015 218 557.5, filed on Sep. 28, 2015 in Germany, the disclosures of which are incorporated herein by reference in their entirety.

BACKGROUND

The disclosure concerns a valve device, and a damping device.

Modern slip-controllable vehicle braking systems offer additional functions which support the driver for example in maintaining the distance from a preceding vehicle. This is achieved by active intervention of the braking system, in that this builds up a brake pressure at the wheel brakes without the driver himself activating the brake pedal. To ensure that the driver does not perceive any disruptive noise during this process, damping devices are used which reduce pressure pulsations caused by the pressure generators of the braking system.

These damping devices consist of a hydraulic resistance and a hydraulic capacitance which is connected upstream of the hydraulic resistance in the hydraulic circuit. A high throttling effect of the hydraulic resistance is necessary for the efficacy of the damping device.

However, a high hydraulic resistance has the disadvantage that it causes a large pressure fall. As a result, the load on the drive of the pressure generator concerned rises and its delivery capacity falls. Finally, this causes a deterioration in the pressure build-up dynamics of the braking system.

As a counter-measure, it is known to use hydraulic resistances with flow-dependently adjustable throttle cross-sections. Large volume flows increase the throttle cross-section of such resistances and reduce the pressure fall. Such hydraulic resistances may be formed for example as valve devices, the valve element of which executes a stroke depending on the throughflow or the prevailing pressure conditions.

DE 40 28 941 A1 describes a valve device which is used as an outlet valve on a stroke piston pump of a vehicle braking system, and which comprises a valve body (pump cylinder) with a throttle cross-section formed thereon, and a valve element regulating the throttle cross-section. The valve element is pressed by a return spring against a valve seat surrounding the throttle cross-section and closes this if the mechanical force of the return spring on the valve element is greater than the hydraulic forces from the pressure medium delivery which support its opening. Under hydraulic forces which are higher than the mechanical return forces, the valve element executes a stroke depending on the force difference, lifts away from the valve seat and opens a control cross-section through which pressure medium can flow past the valve element to an outflow of the valve device.

Viewed in the flow direction of the known valve device, this outflow is arranged laterally on the valve body so that the outflowing pressure medium is deflected into the valve body. Because of this deflection of the pressure medium, flow-induced radial or transverse forces act on the valve element. The opening movement of the valve element consequently resembles a rocking motion, wherein the valve element moves away from the opening of the outflow in the valve body and in some cases rests on the region of the wall of the valve body lying opposite the outflow. The transverse forces on the valve element prevent exclusively centering forces from acting on the valve element, which would excite the valve element to axial oscillations and generate noise.

The disadvantage is that a valve device with a laterally arranged outflow is more complex to produce, and because of the pressure medium deflection, reacts more sensitively to fluctuations in viscosity of the pressure medium, and hence has a wider spread of throttle properties, than valve devices in which the inlet and outlet lie axially opposite each other.

SUMMARY

The disclosure is therefore based on the object of indicating a further noise-improved valve device and/or damping device, which is also further improved with regard to production complexity and throttling properties.

A valve device through which pressure medium may flow, and which is configured according to the disclosure, has an improved throttling effect in that, as the volume flow through the valve device increases, the pressure fall at the valve seat—and consequently also the load on the drive motor of the pressure generator of a slip-controllable hydraulic braking system of a motor vehicle—is reduced. In this way, the throttling properties of a valve device according to the disclosure are less dependent on fluctuations in viscosity of the pressure medium, and hence allow a more precise regulation of the brake pressure of a vehicle braking system across operating conditions. The measures according to the disclosure require no additional components and may therefore be implemented cost-neutrally with regard to assembly complexity of the valve device, and also allow a simpler adaptation of the throttling properties of the valve device to the respective application, for example by simple replacement of the valve element.

Further advantages or advantageous refinements of the disclosure result from the dependent subclaims and/or the description below.

The dependent subclaims concern possible embodiments of the disclosure which, with regard to production, are particularly simple and economic to implement on components of a valve device which are already present.

BRIEF DESCRIPTION OF THE DRAWING

An exemplary embodiment of the disclosure is shown in the drawings and is explained in detail in the description below.

The drawings show.

DETAILED DESCRIPTION

Figure 1:
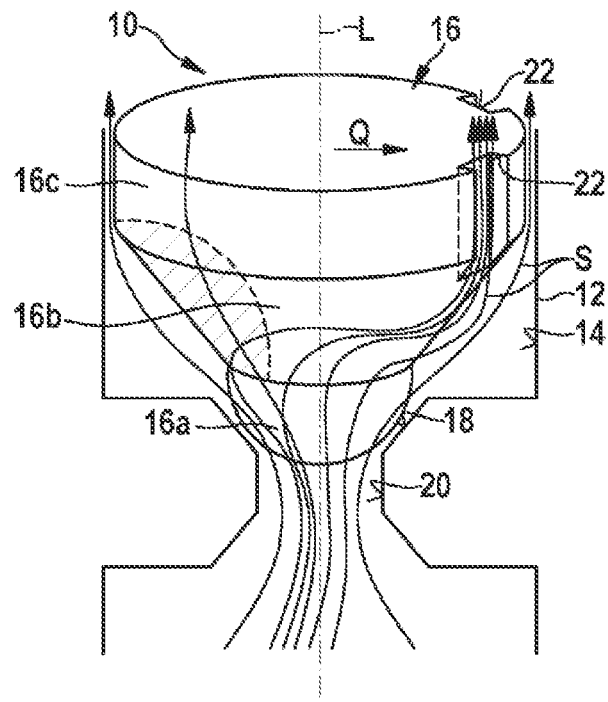
FIG. 1: the diagrammatic depiction of a first exemplary embodiment of a valve device forming the basis of the disclosure, in longitudinal section.

The valve device 10 shown in FIG. 1 consists of a valve body 12 with a valve bore 14 formed thereon, and a valve element 16 which is received axially movably in this valve bore 14. The valve bore 14 is stepped once inwardly in its inner diameter and forms a valve seat 18 which surrounds a throttle cross-section 20. This valve seat 18 is formed for example as an internal cone, but could also be configured so as to be rectangular or rounded.

As illustrated from the flow arrows S in the drawing, in the depiction of FIG. 1 the flow medium flows from bottom to top through the throttle cross-section 20. Accordingly, the valve element 16 is arranged downstream of the throttle cross-section 20 in the valve bore 14.

In the state of the valve device 10 with throughflow as shown, the valve element 16 is raised from the throttle cross-section 20 so that the pressure medium flows around the entire periphery of the valve element 16. An outlet from the valve device 10 is not shown but may be assumed to be provided, and is arranged preferably coaxially to a longitudinal axis L of the valve bore 14.

The drawing also does not show an elastic return element which applies a mechanical return force to the valve element 16, countering the hydraulic flow forces. The stroke executed by the valve element 16 thus depends on the pressure conditions or the volume of pressure medium flowing through the throttle cross-section 20 per time unit.

When the valve device 10 is in the blocked state, the valve element 16 lies on the valve seat 18 and blocks the throttle cross-section 20.

For this, the valve element 16 is divided into several portions. A first portion 16a faces the valve seat 18 and is formed by a peg-like extension, the spherically curved end of which cooperates with the valve seat. In the region of this extension, the valve element 16 has its overall smallest outer diameter.

In the flow direction of the valve device 10, the first portion 16a adjoins a conically formed transitional portion 16b of the valve element 16. Said transitional portion transforms into a third cylindrically formed portion 16c at which the valve element 16 has its largest outer diameter. With the cylindrical portion 16c, the valve element 16 is guided axially movably in the valve bore 14, wherein a gap remains between the cylindrical portion 16c and the wall of the valve bore 14, through which the pressure medium flows past the valve element 16 when the valve seat 18 is opened.

According to the disclosure, the valve element 16 is provided with flow-deflecting means 22; 24. These flow-deflecting means 22; 24 are distributed asymmetrically over the periphery of the valve element 16, whereby the valve element 16 itself has an asymmetric cross-section. The flow-deflecting means 22; 24 are designed in the form of recesses and/or protrusions, and are preferably formed integrally with the valve element 16. The recesses are for example economically configured as grooves 22 formed on the periphery of the cylindrical portion 16c of the valve element 16.

All flow-deflecting means 22; 24 are distributed only over a limited peripheral portion of the valve element 16. They extend axially, i.e. in the throughflow direction of the valve device 10. The pressure medium thus flows through the grooves 22 past the valve element 16.

In addition to the peripheral portion provided with the flow-deflecting means 22; 24, at least a second peripheral portion is provided on the valve element 16 on which no such flow-deflecting means 22; 24 are formed. The two peripheral portions may cover equal or differently sized proportions of the total periphery of the valve element 16.

The cross-sectional form and/or number of the grooves 22 formed may be selected application-specifically. For example, the grooves 22 may be designed with rectangular cross-section or with trough-like rounded cross-section, or as notches. The depth of the grooves 22 may also be established flexibly. To produce the grooves 22, production methods with material removal or without material removal, and forming techniques may be used equally well.

Because of the grooves 22, the first peripheral portion of the valve element 16 has a smaller throttling effect on the pressure medium flow in the assigned gap portion between the outer periphery of the valve element 16 and the inner periphery of the valve bore 14, than the second peripheral portion which is configured without flow-deflecting means 22; 24. Consequently, the pressure medium flows through the first peripheral portion unhindered, and hence with a higher flow speed than through the second peripheral portion. This is indicated in FIG. 1 by the flow arrows S which are more densely packed in this first peripheral portion. Since a higher flow speed is associated with a lower pressure fall, the relatively more choked flow in the region of the second peripheral portion of the valve element 16 causes a higher pressure level in the corresponding gap portion, and consequently a transverse force Q acting on the valve element 16 in the direction of the first peripheral portion. The region of the valve element 16 exposed to the higher pressure level is indicated by hatching in the figure. The amount of the transverse force Q acting on the valve element 16 is dependent on the viscosity of the pressure medium and the volume flow, i.e. the flowing quantity of pressure medium per time unit. As the viscosity or volume flow increases, the amount of transverse force Q also increases, and correspondingly conversely. The greater the transverse force Q acting on the valve element 16, the lower the risk that the valve element 16 will be excited to vibration by centering axial forces or forces acting in the throughflow direction of the valve device 10, which vibrations are finally responsible for noise development. In general, a high transverse force Q on the valve element 16 therefore has a noise-reducing effect.

Figure 2:
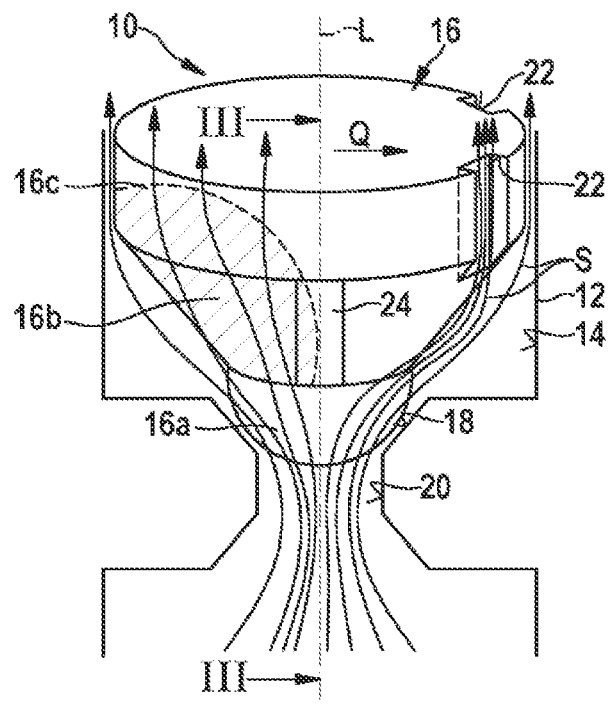
FIG. 2: a second example of a refined valve device according to the disclosure, also in longitudinal section.

In order to limit a flow deflection caused by the pressure differences along the periphery of the valve element 16, towards the peripheral portion with lower flow resistance (first peripheral portion), according to FIG. 2 the valve element 16 is provided with at least one further flow-deflecting means in the form of a wing-like protrusion 24. This wing-like protrusion 24 is arranged on the conically formed transitional portion 16b of the valve element 16, extends in the throughflow direction of the valve device 10, and on the periphery terminates flush with the outer diameter of the cylindrical portion 16c of the valve element 16.

Figure 3:
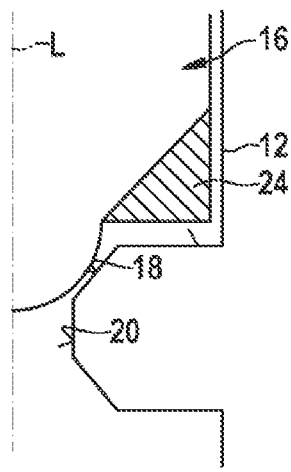
FIG. 3: the cross-section of a detail along section line III-III from FIG. 2.

As can be seen from FIG. 3, the outer contour of the wing-like protrusion 24 is adapted to the inner contour of the valve bore 14 in the region of the transition of the valve bore 14 to the throttle cross-section 20. In the present case, the wing-like protrusion 24 has two straight outer flanks which between them enclose a right angle. Viewed in the peripheral direction of the valve element 16, the wing-like protrusion 24 lies at a transitional region from the first peripheral portion of the valve element 16 provided with the grooves 22, to the second peripheral portion without flow-deflecting means.

The wing-like protrusion 24 helps even out the volume flow along the valve element 16, in that it prevents a transverse flow inside the valve device 10 in which pressure medium overflows from the second peripheral portion, free from flow-deflecting means 22; 24, to the first peripheral portion with flow-deflecting means 22; 24, because of the lower pressure level prevailing there. In other words, the wing-like protrusion 24 throttles a pressure balancing between the different peripheral portions of the valve element 16 and increases the resulting pressure difference, in comparison with a conventional valve element 16 without such flow-deflecting means 22; 24. Finally, this results in a larger transverse force Q acting on the valve element 16. The hatched area of the valve element 16 exposed to the higher pressure level is larger than in FIG. 1.

In addition, the transverse force Q acting on the valve element 16 can be influenced by the choice of width or thickness of the wing-like protrusion 24. As the thickness increases, the choking effect on the pressure medium flow transferring from the second to the first peripheral portion increases. A smaller pressure medium overflow consequently has the effect of increasing the pressure in the second peripheral portion of the valve element 16 which is free from flow-deflecting means 22; 24, or increases the pressure difference between the different peripheral portions of the valve element 16.

Also, the influence of the flow-deflecting means 22; 24 on the valve stroke should be pointed out. Because of the choking effects and the resulting generally higher pressure level in the gap around the valve element 16, the axial force on the valve element 16 causing its opening is increased. This means that a valve element 16 provided with flow-deflecting means 22; 24 executes a relatively larger valve stroke than a conventional valve element 16, for the same volume flow through the throttle cross-section 20. The distance of the valve element 16 from the valve seat 18 therefore increases, and the pressure fall occurring at the valve seat 18 is lower. The latter in turn has a positive effect on the pressure build-up dynamics of a valve device 10 according to the disclosure, in that this can react more quickly to pressure changes.

Figure 4:
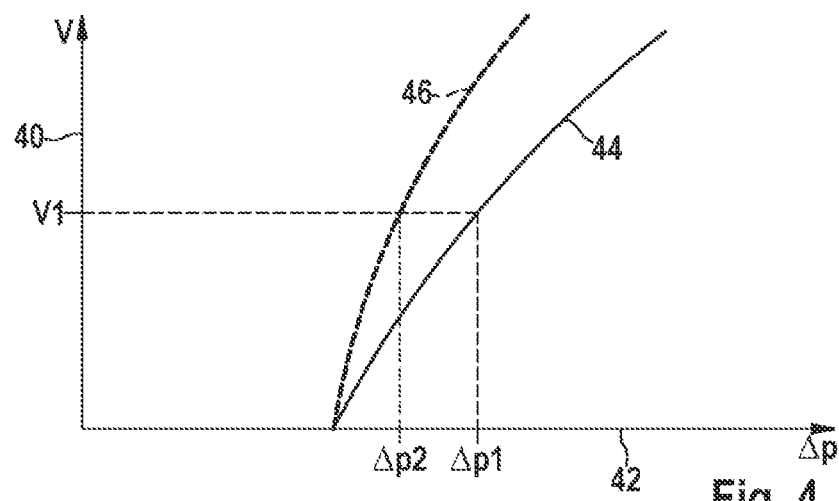
FIG. 4: a diagram of choke curves of a valve device according to the disclosure according to FIG. 1, and according to FIG. 2 in comparison.

FIG. 4 shows the respective choke curves of a valve device 10 which is equipped either with a valve element according to FIG. 1 or with a valve element 16 according to FIG. 2, as a direct comparison.

In the diagram shown, the pressure medium throughflow V per time unit is shown on the vertical axis 40, and a measurable pressure difference between the inlet and outlet of the valve device 10 is shown on the horizontal axis 42. The continuous choke curve 44 is assigned to a valve device 10 which is equipped with a valve element 16 configured according to FIG. 1, i.e. a valve element 16 which has flow-deflecting means 22; 24 only in the form of grooves 22, i.e. no wing-like protrusion 24. The choke curve 46 drawn in dotted lines however is recorded with a valve element 16 which has pressure medium-conducting grooves 22 in combination with at least one wing-like protrusion 24, i.e. is configured according to FIG. 2. The choke curve 44 of the valve element 16 according to FIG. 1 is clearly flatter than that of the valve element 16 according to FIG. 2. This means that for a given pressure medium throughflow V1, the valve element according to FIG. 1 causes a relatively higher pressure difference $\Delta p_1$ than the valve element 16 according to FIG. 2, $\Delta p_2$. As a result, the valve element according to FIG. 1 exerts a stronger throttling effect on the pressure medium flow than the valve element according to FIG. 2. In order for the pressure-setting dynamics to be as high as possible, therefore the use of a valve element 16 configured according to FIG. 2 is recommended.

Figure 5:
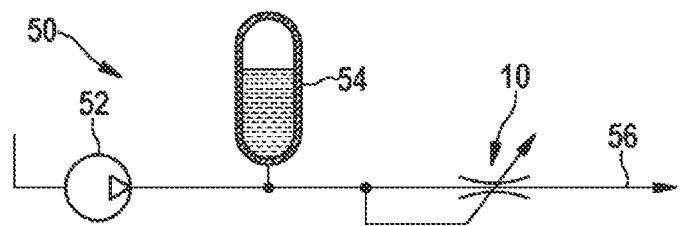
FIG. 5: the diagrammatic structure of a damping device using switching symbols.

FIG. 5 finally shows the structure in principle of a damping device 50, in particular for damping pressure pulsations in a brake circuit of a slip-controllable hydraulic braking system of a motor vehicle, using switching symbols. The damping device 50 is connected to a pressure port of a piston pump 52 supplying brake pressure to the brake circuit, and comprises a valve device 10 configured as described above, and a pressure medium accumulator 54 arranged upstream of this valve device 10. The pressure medium accumulator 54 has a changing pressure medium accumulator volume, and for this in its interior has an elastic partition element and/or a partition element loaded with an accumulator spring. This divides the interior into a pressure medium chamber filled with pressure medium and an accumulator chamber filled with gas. This accumulator chamber may be connected to atmosphere. The valve device 10 throttles the pressure medium outflow from the pressure medium chamber of the pressure medium accumulator 54 into a pressure medium-conducting channel 56 of a brake circuit (not shown in more detail) of a vehicle braking system. The valve device 10 is constructed as described in connection with the description of FIGS. 1 to 4, and is controlled by the pressure level prevailing in the channel 56 or has a pressure-dependent throttling effect. Because of the measures described above on the valve element (not shown in FIG. 5) of the valve device 10, the damping device 50 works with particularly little noise and generates no perceptible operating noise in the vehicle interior of a motor vehicle.

Evidently, changes or additions to the exemplary embodiment of the disclosure presented are conceivable without deviating from the basic concept of the disclosure.

The invention claimed is:

1. A valve device, comprising:
   a valve body that forms a throttle cross-section surrounded by a valve seat;
   a valve element that is received movably in the valve body, that sets the throttle cross-section in response to prevailing pressure conditions, and that includes:
      a first flow-deflecting member, in the form of at least one groove formed in a body portion of the valve element, that causes a transverse force to act upon the valve element transversely to a throughflow direction of the valve device in response to a flow of pressure medium around the valve element; and
      a second flow deflecting member in the form of at least one wing-like protrusion extending from the body portion, such that the flow of pressure medium flows around the second flow deflecting member; and
   an elastic return element that loads the valve element against the throughflow direction of the valve device.

2. The valve device as claimed in claim 1, wherein the at least one wing-like protrusion is arranged on a transitional region from a first peripheral portion of the body portion of the valve element configured with the at least one groove to a second peripheral portion free from the at least one groove.

3. The valve device as claimed in claim 2, wherein the at least one wing-like protrusion is formed on a conically configured portion of the body portion of the valve element and is oriented in the throughflow direction of the valve device.

4. The valve device as claimed in claim 2, wherein respective contours of the at least one wing-like protrusion and of an inner wall of the valve body in a region immediately downstream of the throttle cross-section of the valve device are adapted to each other.

5. The valve device as claimed in claim 1, wherein the at least one groove is formed on a periphery of a cylindrical portion of the body portion of the valve element and extends in the throughflow direction of the valve device.

6. The valve device as claimed in claim 1, wherein the first and second flow-deflecting members are formed integrally with the valve element.

7. The valve device as claimed in claim 1, wherein:
the at least one groove is arranged on at least one first peripheral portion of the body portion of the valve element; and
the body portion of valve element has at least one second peripheral portion that is free of the at least one groove.

8. The valve device as claimed in claim 1, wherein the valve device is configured to throttle a pressure medium flow in a channel which conducts a pressure medium.

9. A damping device, comprising:
a valve device configured to throttle a pressure medium flow in a channel conducting a pressure medium, the valve device including:
  a valve body that forms a throttle cross-section surrounded by a valve seat;
  a valve element that is received movably in the valve body, that sets the throttle cross-section in response to prevailing pressure conditions, and that includes:
    a first flow-deflecting member, in the form of at least one groove formed in a body portion of the valve element, that causes a transverse force to act upon the valve element transversely to a throughflow direction of the valve device in response to a flow of pressure medium around the valve element; and
    a second flow deflecting member in the form of at least one wing-like protrusion extending from the body portion, such that the flow of pressure medium flows around the second flow deflecting member; and
  an elastic return element that loads the valve element against the throughflow direction of the valve device; and
a pressure medium accumulator connected upstream of the valve device.

10. The damping device as claimed in claim 9, wherein the damping device is configured to damp pressure pulsations in a brake circuit of a slip-controllable vehicle braking system.

\* \* \* \* \*